March 7, 1939.　　　O. G. KELLEY　　　2,149,528
LATH FASTENER
Filed Feb. 7, 1938
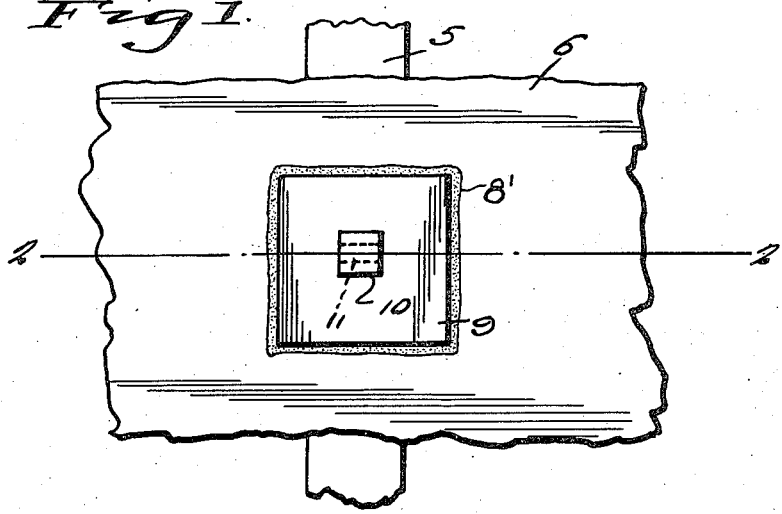
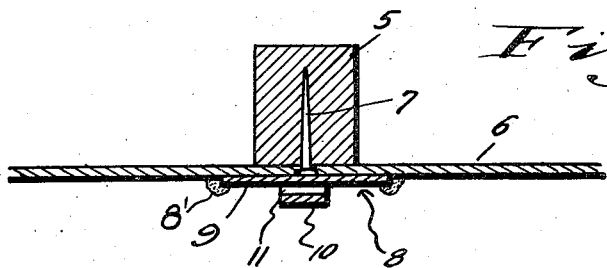
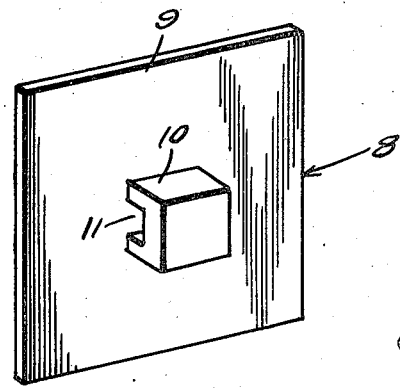
Inventor
Oliver G. Kelley
By *Clarence A. O'Brien*
*Hyman Berman*
Attorneys Patented Mar. 7, 1939

2,149,528

UNITED STATES PATENT OFFICE 2,149,528

LATH FASTENER

Oliver G. Kelley, Newton, Mass.

Application February 7, 1938, Serial No. 189,193

1 Claim. (Cl. 72—118)

This invention appertains to new and useful improvements in lath fasteners and more particularly to a fastener especially adapted for fastening lead sheeting in place for use in rooms where X-ray machines are employed.

The principal object of the present invention is to provide a lath fastener of the character stated which will permit applying the lathing without puncturing the sheet lead.

These and various other important objects and advantages of the invention will become apparent to the reader of the following specification.

In the drawing:

Figure 1 is a fragmentary side elevational view of the device in use.

Figure 2 is a section on the line 2—2 of Figure 1.

Figure 3 is a perspective view of the fastener.

Referring to the drawing wherein like numerals designate like parts, it can be seen in Figures 1 and 3, that numeral 5 denotes a wall stud to which the lathing sheet 6 of lead is applied. Numeral 7 denotes the nail for securing the sheet 6 in place and to the inside of this sheet 6 and over the head of the nail 7 is disposed the device generally referred to by numeral 8 which consists of the plate 9 of substantially pure lead having its edges welded, as at 8', to said sheet 6. This plate 9 is preferably square and at its central part is formed with the outstanding boss 10 having the opening 11 transversely therethrough. This boss 10 is located at a point which will cover the head of the nail 7 and preclude any possibility of X-rays getting through the sheet lathing 6 at this point. The opening 11 in said boss is for use in wiring metal lathing to the boss in any suitable manner.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A fastener for securing lathing to lead sheathing, and covering a nail in said sheathing comprising a plate of lead adapted for welding to the sheathing over a nail, said plate being provided with a staple-like relatively thicker member extending centrally from the outer face thereof for use in wiring lathing thereto.

OLIVER G. KELLEY.